Jan. 3, 1939. J. R. GASTON 2,142,188
PROTECTIVE BUSHING FOR ELECTRICAL APPARATUS
Filed Dec. 2, 1936 6 Sheets-Sheet 2

INVENTOR
John R. Gaston
BY
A. D. F. Libby
ATTORNEY

Jan. 3, 1939.   J. R. GASTON   2,142,188
PROTECTIVE BUSHING FOR ELECTRICAL APPARATUS
Filed Dec. 2, 1936   6 Sheets-Sheet 5

INVENTOR
John R. Gaston
BY A. D. T. Libby
ATTORNEY

Patented Jan. 3, 1939

2,142,188

UNITED STATES PATENT OFFICE 2,142,188

PROTECTIVE BUSHING FOR ELECTRICAL APPARATUS

John R. Gaston, East Orange, N. J., assignor to American Transformer Company, Newark, N. J.

Application December 2, 1936, Serial No. 113,793

32 Claims. (Cl. 175—30)

This invention relates to a protective bushing for electrical apparatus, and is especially adapted for use in connection with transformers, and particularly those used in the high-tension distribution systems.

In the past, it has been the practice to install, either in the transformer or closely adjacent thereto, a lightning arrester for each line wire, and in many cases, also a fuse cut-out, the leads being taken into the transformer through suitable separate insulators or bushings.

It is the principal object of my invention to combine in one piece of apparatus, all of these protective features, in addition to others, and I have chosen to combine these features into a new type of bushing through which current is conveyed to the transformer or other electrical apparatus with which the bushing may be used.

By combining into one piece of apparatus, a bushing, lightning arrester and distinctive type of cut-out, I have reduced the overall initial cost of such equipment, as well as the cost of installation and maintenance.

These and other objects will be apparent to one skilled in this art, on a reading of the specification, taken in connection with the annexed drawings, wherein.

Referring now to the drawings, wherein like numbers refer to corresponding parts in the various views, 1 is an insulator of suitable material, such as porcelain or quartz, having a skirt 2. The insulator 1 is seated in the upper part 3 of a metallic connector. This union may be accomplished in any one of a number of ways, but the union is preferably enhanced by a series of cooperative indentations 4. The lower part 5 of the metallic connector carries an insulator 6 which may or may not be similar to 1 as to kind of material, but it should be strong and of good insulating qualities. The connector is provided with a flange 7 for mounting the bushing in a part of the transformer casing, such as the cover 8.

A metallic cap, having a flange portion 9, is attached to the upper end of the insulator 1 through the medium of a cementitious material 10 which engages indentations or corrugations 11 on the insulator 1. The cover portion 12 of the cap may be fastened to the flange portion 9 in any satisfactory manner as by set screws 13. The cover portion 12 has a projection or stem 14 with a notch 15 therein to receive a line conductor 16 which may be held in the notch 15 by a set screw 17.

Mounted within the inner part of the cap is an annular metallic spark gap member 18, the same being held to the cover 12 by a plurality of screws 19, and having an annular spark gap edge 20. Within the central space within the member 18 is mounted a spring 21 which presses a circuit contact member 22, having an annular flange 23, into contact with an annular seat 24 formed in the member 18. To carry the current from the conductor 16 and cover 12 to the contact 22, a flexible conductor 25 is used, the same being attached to the respective parts in any satisfactory manner as by screws 26.

Positioned on the lower part of the annular seat 24, is a cylindrical insulator 27, and between this insulator and the interior surface of the insulator 1, is a mass of finely divided high-resistance material 28, such as carborundum, which is held in place at the top by a flanged metallic washer 29. An annular ring 95 of insulating material, similar to that of the tube 27, is positioned between the tube 27 and the connection on the interiorly projecting part of the flange 7. Positioned on the washer 29, is an annular insulator 30 which in turn supports an annular double-contact spark gap member 31, one of the gap edges 32 being positioned to cooperate with the gap edge 20, while the other gap edge 33 cooperates with the metallic washer 29 to give a double-series air gap. The members 18 and 31 are separated by an insulator 34. Since the material 28 is positioned on the surface of the connector 7, this in turn is connected to the casing of the transformer, which is usually grounded, and the interior lightning arrester circuit will be from the cover 12 of the member 18 through the gaps 20—32, 33—29, through the material 28, to ground.

Positioned within the insulator 6 is another insulator 35 of strong material, such as fiber, having an annular flange 36 interlocking with an annular flange 37 on the insulator 27. Resting against the flange 37, is the bottom part 38 of a double-cylindrical core member of magnetic material, and positioned between the inner cylinder 39 thereof, and the outer cylinder 40, is an electro-magnetic winding 41. As will be seen from Figure 1, the end of the core cylinder 39 is shorter or does not extend downwardly as far as the cylindrical core portion 40 which has a flange 42 which overlaps and engages the end of the insulator 35.

Positioned below the flange 42, is a flux-gathering washer or member 43 of magnetic material such as steel. Below the member 43 is an annular ring 44 of non-magnetic material which is fastened to the flange 42 through the washer or member 43 by screws 45. Preferably integral with the ring 44, and depending therefrom, are a plurality of sets of arms 46 and 47. The set of arms 46 supports pawls 48, while the arms 47 support the type of pawl shown at 49 in Figure 17.

Passing through the inner core member 39 and through the cylindrical insulator 27, is a plunger 50, on the upper end of which is carried a contact member 51 of suitable contact material such as copper, to cooperate with the contact 22. Surrounding the upper end of the plunger 50, is a spring 52 which, when the plunger is in the closed position shown in Figure 1, tends to urge the plunger downwardly to separate the contacts 51 and 22. The spring 52 is seated in any satisfactory manner in the contact 51 and anchored thereto, and on a seat 53 located on the upper end of the core of the electro-magnet and also anchored thereto. The electro-magnet, it may be noted in passing, has the external cylindrical portion slotted at 54, and the internal cylinder slotted at 55 to prevent eddy currents being set up in the core. If desired, a guide collar 56 may be used in the position indicated to provide a central bearing for the plunger 50.

Loosely mounted on the plunger 50, is an armature 57 in the form of a cylinder having an annular flange 58 which extends outwardly, to be engaged by the ends 59 of the pawls 49, to hold them in what I term set or trigger position.

Fastened to the plunger or shaft 50, below the armature 57, in any satisfactory manner as by screw-threads 60, and a screw 61, is a collar 62 having a flange 63 extending away from the plunger into engagement with the ends 64 of the pawls 49 pivoted at 65 to their respective arms 47, all as more clearly shown in Figure 6.

Fastened to the bottom of the plunger 50, through the medium of a collar 66, is a thermostatic device 67. Passing through the hollow center of the thermostat 67, is a tubular member 68 having an annular disc 69 fastened thereto. To the disc 69 is attached, as by means of screws 70, a pair of arms 71 made of suitable resilient material. The arms 71 pass upwardly through slots 72 in the flange 63 of the collar 62 into engagement with notches in the pawls 48 for the purposes which will be hereinafter described.

Figures 10, 11, 12, 13, 14, 15, 16, 17:
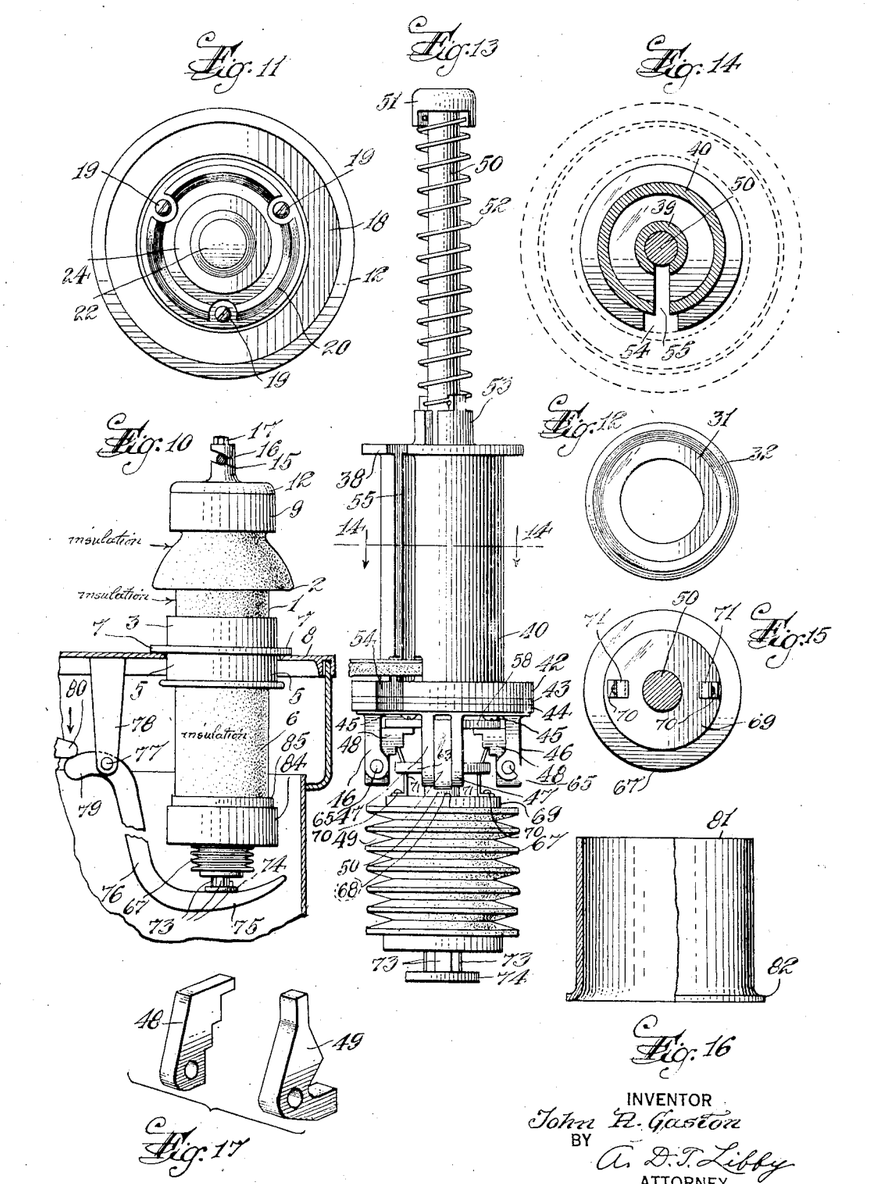
Figure 10 is an elevational view, on a reduced scale, of the bushing, showing it installed in a transformer casing, with means for resetting the circuit breaker part of the bushing.
Figure 11 is an interior view of the two portions forming the cap, with one of the arrester gap parts in assembled position therein.
Figure 12 is a plan view of one of the arrester elements.
Figure 13 is an elevational view of the circuit breaker mechanism mounted within the interior of the bushing.
Figure 14 is a view on the line 14—14 of Figure 13.
Figure 15 is a plan view looking down on the top of the thermostat, with the tubular movable member associated therewith.
Figure 16 is a part-sectional and part-elevational view through the contact and assembly cylinder shown next to the interior lower portion of the insulator of the bottom part of Figure 1.
Figure 17 is a perspective view of the two types of control pawls used for controlling the circuit breaker.

The lower end of the tube 68 terminates in arcuate fingers 73 which are adapted to be fastened to a disc 74, the bottom of which is adapted to be engaged by the end 75 of a lever 76, either insulated or of insulating material, pivoted at 77 to an arm or bracket 78 carried by the cover 8 or some other part of the casing of the apparatus. Acting on the end 79 of the lever 76, is a cam member 80 adapted to be moved in the direction of the arrow to cause the lever 76 to push the tubular member 68 upwardly to either open or close the circuit breaker, as will be later explained. In the showing of Figure 10, the bracket 78 and lever 76 are not shown in the exact proper position, because of lack of space on the drawings. It will also be noted that the cam 80 is mounted to be rotated by a rod extending without the casing through an arc of 180°, so that it will pass clear of the end 79 of the lever 76. Where a bushing is used in connection with a transformer mounted on the pole, the rod for operating the cam 80 may be rotated by a lever operated from the ground by a hook-pole.

Within the lower portion of the insulator 6, is a metallic collar 81 (see Figure 16) which acts to hold the unit of Figure 13 in place within the bushing. This is accomplished through the medium of the flange 82 being pushed against the washer 83 by the flange nut 84 engaging a threaded ring 85 fastened to the lower part of the insulator through cementitious material 86 in a manner similar to that of holding the member 9 to the insulator 1.

One end of the coil or winding 41 is fastened by a flexible conductor to the shaft or plunger 50, or to a clip 87 fastened to the flange 63 of the collar 62. The other end of the winding 41 is fastened by a flexible lead to the cylindrical bushing 81, which is preferably of copper, and the exterior connection may be made to the ring 84 through a terminal 88. The connections to the shaft or plunger 50 and to the collar 81 are, for the purpose of clarity, not shown, but from what has been said, it will be clear that a circuit through the circuit breaker portion of the bushing will be from the cover 12 through the flexible connector 25 to the breaker contact 22, to contact 51, through the plunger 50 and flexible lead therefrom, to the winding 41 and through the winding and other flexible lead to the bushing 81 and ring 84, to the terminal 88. It will also be seen that the circuit through the breaker mechanism is in shunt or parallel with the lightning arrester circuit first described.

There is also a second arrester circuit which is provided to take care of excessive surges which may come to the apparatus by way of the conductor 16, and this path is from the cap at the top of the arrester 1, over the skirt 2, to the connector 3 which is grounded. This auxiliary arrester circuit is brought into action by reason of the high-resistance material 28 which, under surge conditions, becomes ionized and a more or less good conductor. The resistance of this material will, however, never reach zero, and consequently, if the surge currents are excessively high, the voltage built up across this resistance material may tend to destroy the arrester and puncture the tube 27. To prevent this, the exterior parts are so arranged that this extraordinary surge, which might bring about the condition stated, will flash over the insulator 1 as mentioned, this flash-over voltage being less by a safe margin than the voltage required to puncture the insulator 27.

In certain cases, where the voltage on the line requires a rather long insulator 1, and possibly a plurality of skirts 2, it may be desirable to furnish extension pieces attached to the cap 9 and the connector 3 to thereby provide an external gap to coordinate the interior and exterior conditions under which the bushing is required to function.

The operation of the circuit breaker part of my protective bushing is depicted in Figures 18 to 25 inclusive, but before describing this operation, it may be said that the circuit breaker may be tripped in any one of the following three ways:

First, it may be tripped magnetically by the armature 57 by a predetermined overload.

Second, it may be tripped by the thermostat 67 on a predetermined rise of temperature within the apparatus, and when using a transformer, the thermostat 67 is preferably positioned within the oil and therefore acted on by the rise in temperature of the oil.

Third, it may be tripped mechanically as heretofore indicated.

Figures 1, 2, 3, 4, 5:
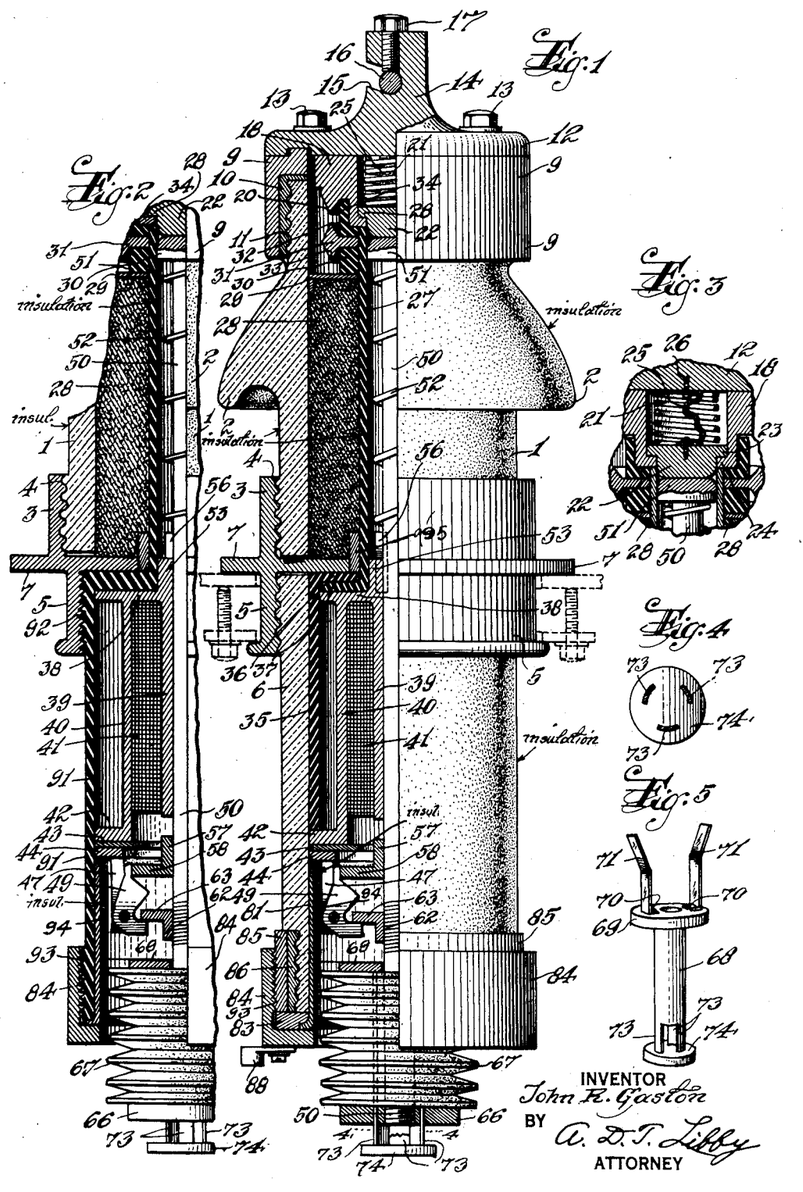
Figure 1 is a half-elevational and half-sectional view through my improved form of protective bushing.
Figure 2 is a part-sectional view, similar to the left hand side of Figure 1, but showing a modified construction.
Figure 3 is a sectional view through the contacts used in the circuit breaker part of the mechanism.
Figure 4 is a sectional view on the line 4—4 of Figure 1.
Figure 5 is a perspective view of one of the detail pieces used in the apparatus.
Figure 6:
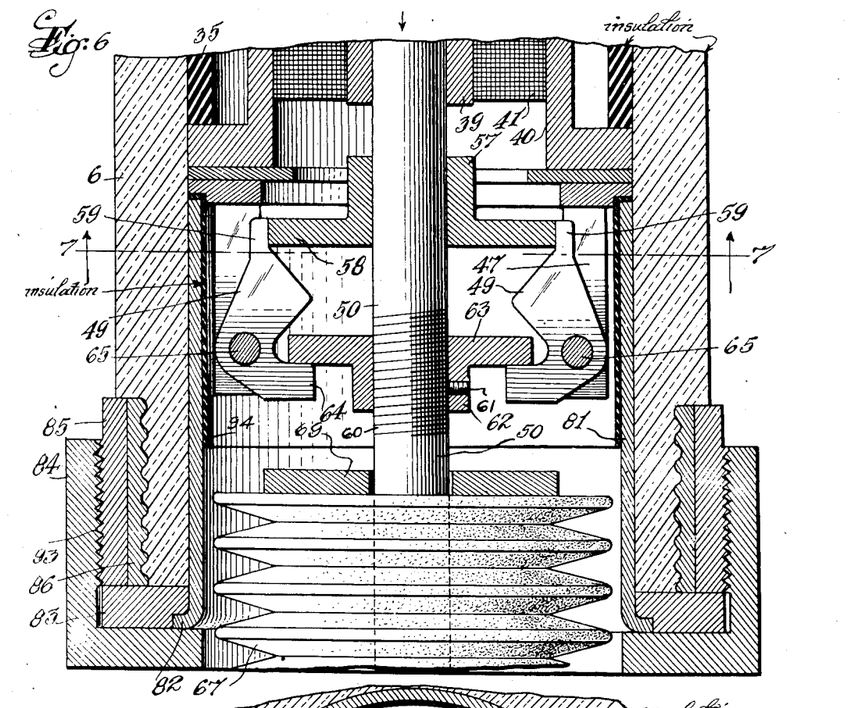
Figure 6 is a view on an enlarged scale, partly in section and partly in elevation, of the lower part of the device shown in Figure 1.
Figure 7:
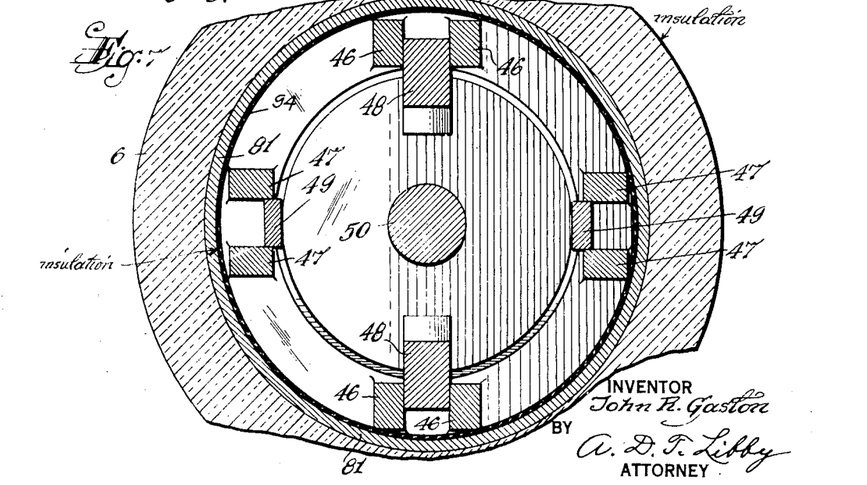
Figure 7 is a view on the line 7—7 of Figure 6.

It will be clear, by reference to Figures 1 and 6, that the plunger 50 is held in circuit-closing position by reason of the flange 63 being held on the ends 64 of the pawls 49, and these cannot be released until the armature 57 has been drawn upwardly by the electro-magnet 41. In case of an overload, the armature 57 will be attracted and the pawls will be released, and, due to the effect of the spring 52 and the weight of the plunger and parts attached thereto, it will move rapidly downward, as indicated in Figures 18 and 19, where the plunger and associated parts are shown in substantially their lowermost position.

Figure 18:
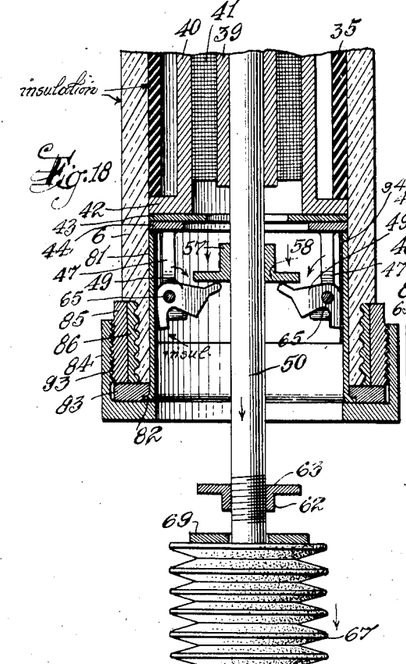
Figure 18 is a view of certain of the circuit breaker parts after the breaker has been tripped, and with certain of the moving parts at substantially their lowermost position.
Figure 19:
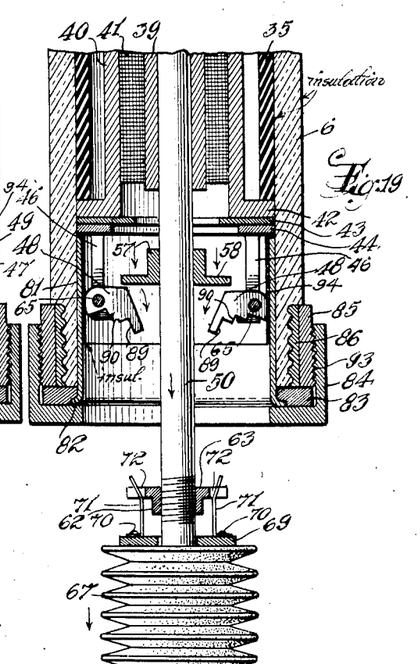
Figure 19 is a view similar to Figure 18, but at right angles thereto.
Figure 20:
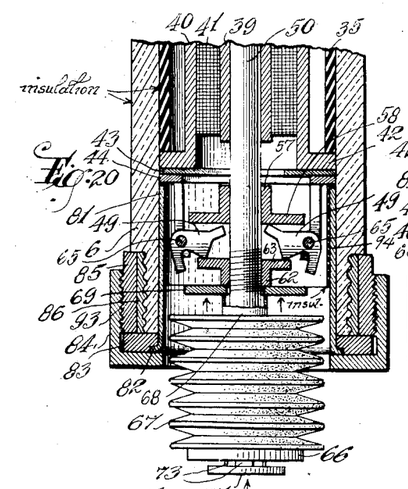
Figure 20 is a view of the parts shown in Figure 18, but during the operation of resetting the circuit breaker.
Figure 21:
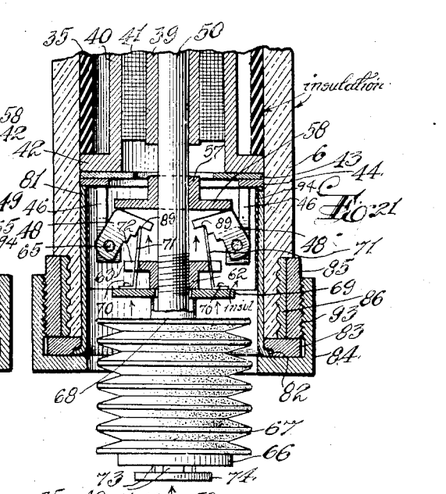
Figure 21 is a view at right angles to Figure 20, but at a further point in the cycle of the resetting operation.

While the pawls 49 are, when released, in the position shown in Figure 18, the pawls 48 are in the position shown in Figure 19, but it will be noted that the heels of both sets of pawls are prevented from contacting with the tubular member 81 by a tubular insulator 94 which has a flange positioned between the end of the tubular member 81 and the member 44.

To close the circuit breaker mechanism, the lever 76 is actuated, as has been described, and the end of the lever engaging below the disc 74, moves the tubular member 68 upwardly so that the resilient arms 71 engage in steps or notches 89 of the pawls 48. At the same time, the disc 74 engages the collar 66, whereby the plunger with the thermostat is moved upwardly and the pawls 48 are lifted from the position of Figure 19 to the position of Figure 21. At the same time, the pawls 49, positioned in a plane at right angles to the pawls 48, are moved from the position of Figure 18 to that of Figure 20.

Figure 22:
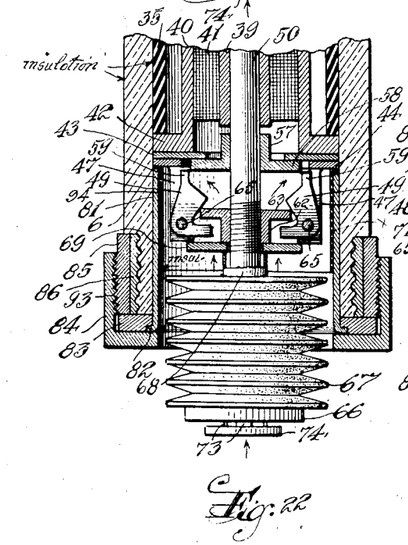
Figure 22 is a view similar to Figure 20, but with two of the control pawls moved to normal lock position, and just before the armature drops into position to lock the pawls in the position as shown in Figure 6.
Figure 23:
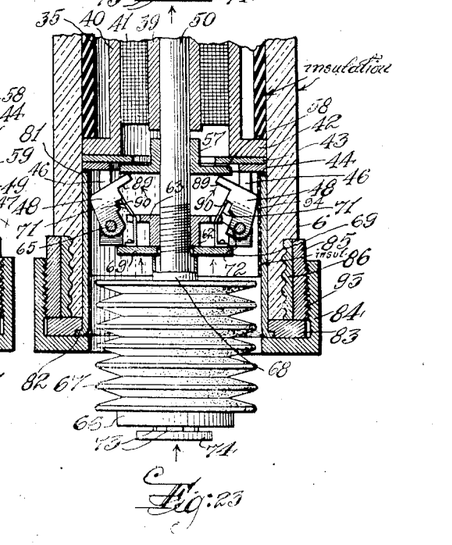
Figure 23 is a view similar to Figure 22, but taken at right angles thereto, showing the position of the other set of control pawls in manual trip position.
Figure 24:
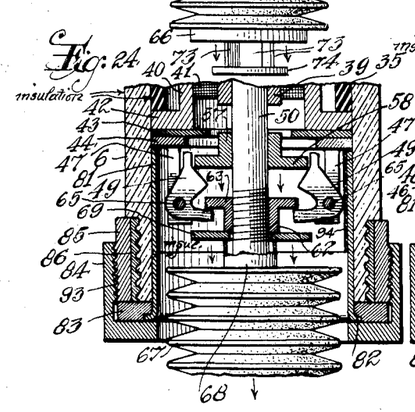
Figure 24 is a view after the armature has dropped to the pawl-locking or trigger position of Figure 6, and with the plunger and thermostat device carried on the plunger in the act of moving downwardly to the position of Figure 1.

As the upward movement of the plunger is continued, the parts reach the position shown in Figures 22 and 23, at which time the spring fingers 71 are about ready to drop into steps or notches 90 and the ends 59 of the pawls 49 are moved clear from the peripheral edge of the flange 58 of the armature. Directly thereafter, provided there is no overload on the line, the armature will drop to the position shown in Figure 24, it being understood that the plunger, after being pushed upwardly against the tension of the contact 22 and spring 21, will have a short downward movement.

When the contact 51 engages the contact 22, the upward movement of the plunger 50 tends to raise the contact 22 from its seat against the tension of the springs 21.

Figure 8:
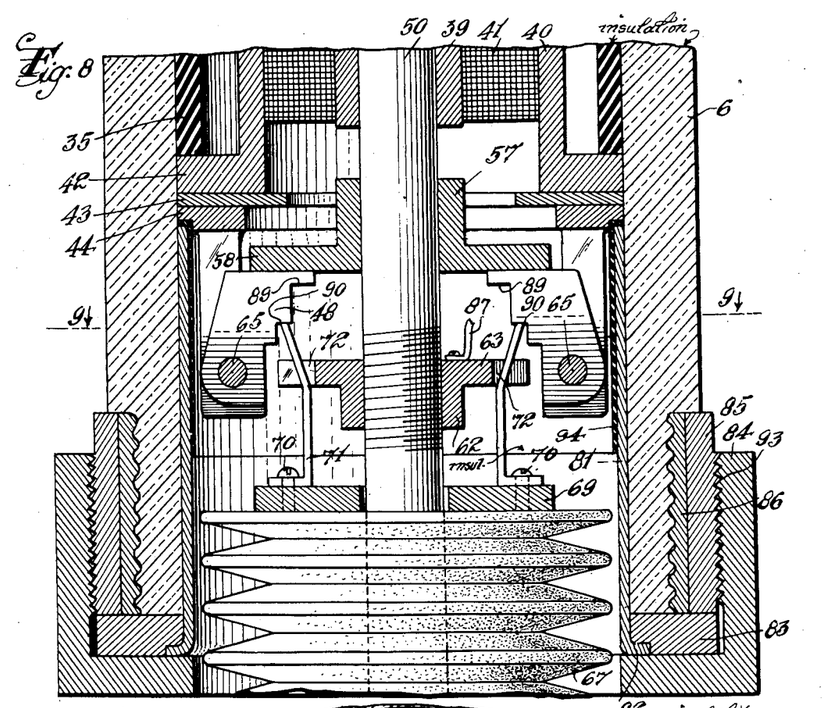
Figure 8 is a view similar to Figure 6, but taken at right angles thereto.
Figure 9:
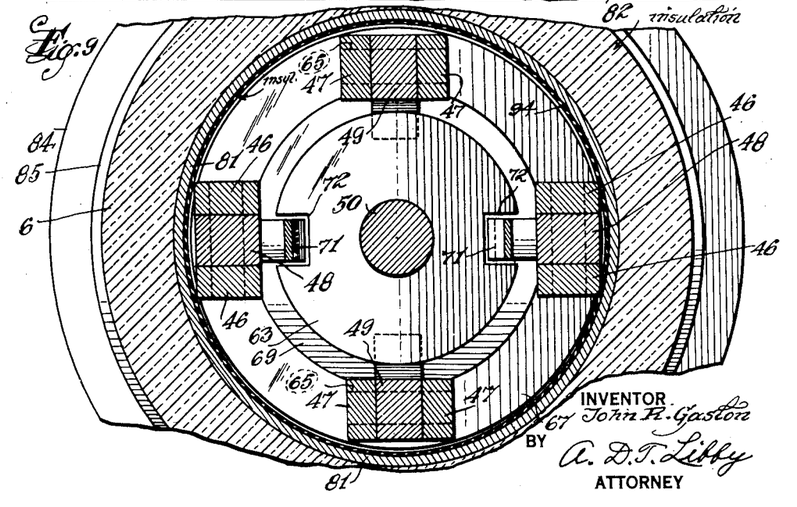
Figure 9 is a view on the line 9—9 of Figure 8.
Figure 25:
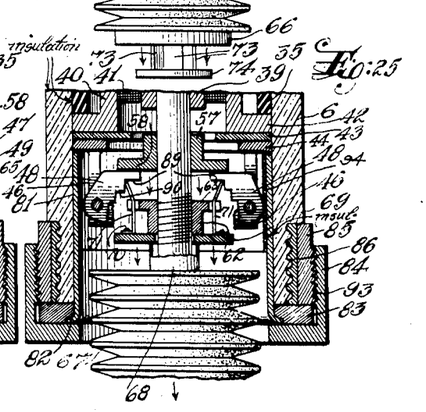
Figure 25 is a view similar to Figure 24, but at right angles thereto.

On releasing the lever 76, the tubular member 68 will carry the spring fingers 71 downwardly, moving them from the notches 89 to notches 90, thereby holding the pawls 48 continuously against the armature as shown in Figures 25 and 8.

If, for any reason, the heat from the interior of the apparatus is sufficient to operate the thermostat 67, this will expand and lift, through the medium of the disc 69, the tubular or sleeve member 68, so that the fingers 71 will lift the pawls 48 to push the armature upwardly, whereby the trigger pawls 49 are released from engagement with the peripheral edge of the flange 58 of the armature. Since, as has been explained, the tension of the spring 52 and the weight of the plunger is resting on the ends 64 of the pawls 49, they will trip and release the plunger. The resetting operation is the same as before.

Should it be necessary to trip the circuit breaker manually, the lever 76 is caused to act on the flange 74 of the tubular member 68, thereby pushing it upwardly so that the spring fingers 71, which are normally in the notches 90 of pawls 48, move these pawls upwardly to a position such as shown in Figure 23, which lifts the armature 57 and its flange 58 upwardly beyond the ends 59 of the pawls 49, thereby releasing the trip pawls 49, which will open the circuit breaker as has heretofore been described.

This manual trip action just described is slightly different from the thermostatic action in which the expansion of the thermostat 67 lifts the tubular member 68 so that the spring fingers 71 on the flange 69 act on the pawls 48 in the same manner as for the manual trip operation. The collar 69 in this thermostatic trip is always against the top of the thermostat 67, and in order to prevent undue expansion of the thermostat, the collar 69 will finally come into engagement with the lower end of the collar 62, which thereby acts as a stop-protecting device for the thermostat.

From what has been said, it will be understood that the circuit breaker will not stay in closed position if an overload exists in the apparatus, or if the temperature of the apparatus is above the limit to which the thermostat 67 is adjusted.

The bushing thus acts as a bushing to convey current to the apparatus and also as a circuit breaker to eliminate the replacement of fuses, and as a lightning arrester to protect the apparatus.

It will be obvious that many changes may be made in the details entering into the construction of my new form of protective bushing. For example, while I have shown two interior series gaps, only one may be used, or more than two may be used. Likewise, as shown in Figure 2, the ceramic type of insulator 6 may be replaced with an insulator 91 of some other type of material which may be threaded at 92 to engage corresponding threads on the lower part 5 of the conductor, and threaded at 93 to engage cooperative threads on the flanged nut 84.

Also, while I have specified a finely divided high-resistance material 28 for part of the lightning arrester, it is within the purview of my invention to use a hermetically sealed chamber with a suitable gas therein which, with the cooperating parts, will have properties similar to the material 28. Furthermore, while I have shown one skirt 2 on the insulator 1, a plurality of skirts may be used. In addition, while I have shown a manually operated lever 76 for resetting the circuit breaker, I may use an automatic device for this purpose.

Other and further changes in the details will be apparent to one skilled in this art, and therefore, in the interpretation of the claims, I do not wish to be unduly limited in the scope thereof.

What I claim is:

1. A bushing for making a connection from a power line to an electrical apparatus such as a transformer, including a portion of insulating material for projection within the said apparatus and a portion of insulating material located exteriorly of the apparatus with means comprising a metallic sleeve for joining said portions, means at the other end of said exterior portion for attaching a lead-in conductor thereto, lightning arrester parts comprising fixed and variable gaps arranged in series and circuit breaker contacts all housed in cooperative relation within the exterior portion, an electro-magnet located within the interior projecting portion, a plunger passing through the magnet into the exterior portion for operating said breaker contacts, said breaker contacts, plunger and magnet being connected so as to form a normally closed circuit through the bushing from said lead-in conductor one side of the arrester being electrically connected to said conductor, a thermostat device responsive to rise in temperature within the apparatus on which the bushing is used for tripping the circuit breaker, said thermostat device being carried on the lower end of said plunger at the free end of said interior part, an armature for said magnet, a spring for moving the plunger to open position, and devices cooperating with the plunger and armature for controlling the movement of said plunger.

2. A protective bushing as defined in claim 1, further characterized in that manual means are provided for tripping the plunger to separate said breaker contacts and to reset the plunger to close the contacts.

3. A protective bushing as defined in claim 1, further characterized in that manual means are located on and at the lower end of the plunger for acting on said cooperating devices to trip the plunger and reset the same to circuit-closed position.

4. A protective bushing as defined in claim 1, characterized in that one of said contacts is carried on the upper end of the plunger while the other contact is resiliently held in longitudinal adjustment with the plunger contact, with means for conveying current to the said resiliently mounted contact.

5. A protective bushing as defined in claim 1, characterized in that the said exterior portion includes a hollow insulator having a circumferential skirt intermediate its ends, a metallic cap carried on the outer end of the insulator and having means for attaching a current conductor thereto and carrying one of the circuit breaker contacts, a tubular insulator surrounding and spaced from the plunger and the inner wall of the first insulator and extending longitudinally of the plunger, said spring being located around the plunger within the tubular insulator, one of the lightning arrester gap parts being circular in shape and carried by and within the cap; a second circularly shaped gap part mounted in spaced relation to the first gap part, and a mass of finely divided high-resistance material located radially between the two first-mentioned insulators and axially between the second-mentioned gap part and a grounded member of the bushing.

6. A protective bushing as defined in claim 1, characterized in that the said exterior portion includes a hollow insulator having a circumferential skirt intermediate its ends, a metallic cap carried on the outer end of the insulator and having means for attaching a current conductor thereto, a tubular insulator surrounding and spaced from the plunger and the inner wall of the first insulator and extending longitudinally of the plunger, said spring being located around the plunger within the tubular insulator, one of the lightning arrester gap parts being circular in shape and carried by and within the cap, said arrester gap part having an interiorly projecting flange for supporting one of said circuit breaker contacts, a spring housed within said arrester part and acting against said contact, a second circularly shaped gap part positioned around the upper end of said second-mentioned insulator and in spaced relation to the first-mentioned gap, and a mass of finely divided high-resistance material located radially between the two first-mentioned insulators and axially between the second-mentioned gap part and a grounded member of the bushing.

7. A protective bushing as defined in claim 1, characterized in that the magnet core includes a pair of spaced cylindrically shaped members of magnetic material joined at the end adjacent the union with said exterior portion with the winding of the electro-magnet between said spaced members.

8. A protective bushing as defined in claim 1, characterized in that the magnet core includes a pair of spaced cylindrically shaped members of magnetic material joined at the end adjacent the union with said exterior portion with the winding of the electro-magnet between said spaced members, the walls of said members being preferably slotted for the purpose described, and arms projecting downwardly adjacent the lower end of the electro-magnet for supporting said control devices.

9. A protective bushing as defined in claim 1, characterized in that said magnet armature is slidably located on said plunger and said control devices comprise at least two sets of pawls arcuately disposed about the plunger, one set being normally held in trigger-acting position to release the plunger on actuation of said armature by the magnet, and the other set adapted to be operated at least by the thermostat device to move the armature from its trigger-holding position with respect to said first-mentioned set of pawls.

10. A protective bushing as defined in claim 1, characterized in that said magnet armature is slidably located on said plunger and said control devices comprise at least two sets of pawls arcuately disposed about the plunger, one set being normally held in trigger-acting position to release the plunger on actuation of said armature by the magnet, and the other set adapted to be operated by the thermostat device as well as by manually operated means to move the armature from its trigger-holding position with respect to said first-mentioned set of pawls.

11. A protective bushing as defined in claim 1, characterized in that the magnet core includes a pair of spaced cylindrically shaped members of magnetic material joined at the end adjacent the union with said exterior portion with the winding of the electro-magnet between said spaced members, the outer magnet core member extending downwardly farther than the inner core member, while the armature comprises a flanged cylinder fitting over the plunger below the inner core member, and the flange of the cylinder extends over but below the end of the outer core member.

12. A protective bushing as defined in claim 1, characterized in that the magnet core includes a pair of spaced cylindrically shaped members of magnetic material joined at the end adjacent the union with said exterior portion with the winding of the electro-magnet between said spaced members, the outer magnet core member extending downwardly farther than the inner core member, while the armature comprises a flanged cylinder fitting over the plunger below the inner core member, and the flange of the cylinder extends over but below the end of the outer core member, and further characterized in that two sets of pawls are arcuately disposed about the plunger, one set having one set of their ends resting against the periphery of the armature flange when the plunger is in contact-closing position, while the other parts of said pawls hold the plunger in circuit-closing position, and the other set of pawls adapted to be operated at least by the thermostat device to move the armature so the flange thereof is moved out of holding engagement with said pawl ends whereby the plunger is released to open the circuit through the bushing.

13. A protective bushing as defined in claim 1, characterized in that the magnet core includes a pair of spaced cylindrically shaped members of magnetic material joined at the end adjacent the union with said exterior portion with the winding of the electro-magnet between said spaced members, the outer magnet core member extending downwardly farther than the inner core member, while the armature comprises a flanged cylinder fitting over the plunger below the inner core member, and the flange of the cylinder extends over but below the end of the outer core member, and further characterized in that two sets of pawls are arcuately disposed about the plunger, one set having one set of their ends resting against the periphery of the armature flange when the plunger is in contact-closing position, while the other parts of said pawls hold the plunger in circuit-closing position, and plural means, each individually actuatable, for moving the armature so the flange thereof is moved out of holding engagement with said pawl ends whereby the plunger is released to open the circuit through the bushing.

14. A bushing for an electrical apparatus including, in combination, a casing having parts adapted to extend exteriorly and interiorly of the apparatus, and comprising in part an insulator having a skirt and lightning arrester parts, including an open gap and a series high-resistance, and circuit breaker contacts positioned in the exteriorly projecting end of the casing, one of said contacts being electrically connected to an arrester part with means for connecting an outside circuit wire to one of said contacts and said arrester part, an electro-magnet connected in series with said contacts, and an armature therefor with means for controlling the operation of the armature located in the interiorly projecting end of the casing, and a spring-actuated plunger positioned in both of said parts and carrying one of said breaker contacts and controlled by devices associated with said armature.

15. A bushing for an electrical apparatus as defined in claim 14, further characterized in that the exteriorly projecting part of the bushing terminates in a metal cap to which the outside circuit wire is attached, and carrying an arrester gap part and one of said breaker contacts in resiliently mounted relation to the other breaker contact, the cooperating open gap part being electrically connected to said series resistance.

16. A bushing for an electrical apparatus as defined in claim 14, further characterized in that the exteriorly projecting part of the bushing terminates in a metal cap to which the outside circuit wire is attached, and carrying an arrester gap part and one of said breaker contacts in resiliently mounted relation to the other breaker contact, the cooperating open gap part being electrically connected to said series resistance, said exteriorly and interiorly projecting parts being joined by a metallic connector adapted to be grounded, the end of the series resistance being electrically joined with said connector.

17. A bushing for an electrical apparatus as defined in claim 14, further characterized in that the exteriorly projecting part of the bushing terminates in a metal cap to which the outside circuit wire is attached, and carrying an arrester gap part and one of said breaker contacts in resiliently mounted relation to the other breaker contact, the cooperating open gap part being electrically connected to said series resistance, said exteriorly and interiorly projecting parts being joined by a metallic connector adapted to be grounded, the end of the series resistance being electrically joined with said connector, and further characterized in that an emergency surge discharge gap is formed between the top metal cap and the metal connector over said skirt.

18. A bushing for an electrical apparatus as defined in claim 14, further characterized in that a thermostatic device carried on the end of the plunger and manually operated means mounted to act on the lower end of the plunger are provided for opening the circuit breaker contacts.

19. A bushing for an electrical apparatus as defined in claim 14, further characterized in that a thermostatic device carried on the end of the plunger and manually operated means mounted to act on the lower end of the plunger are provided for opening the circuit breaker contacts, said manually operated means also being used to move the plunger to close said contacts.

20. A bushing for a primary lead to an enclosed transformer including an exterior part and a part extending within the transformer casing, said parts being joined by a metallic connector fastened to a part of the transformer casing, a metal cap on the exterior part for attaching said primary lead, an open air gap housed within the confined of the cap, one of said gap parts being connected in series, through a normally high resistance, with said connector forming an arrester, circuit breaker contacts, one of which is resiliently mounted and electrically connected to said cap, and an electro-magnetic winding connected in series-parallel with said arrester, a plunger carrying one of said breaker contacts, a spring for moving the plunger to open position, an armature actuated by said winding, and devices cooperating with said armature for releasing the plunger, and means for restoring the plunger to circuit-closing position.

21. A protective bushing as set forth in claim 20, further characterized in that said plunger carries a thermostat which, under certain conditions of operation, acts on said cooperating devices to trip the plunger.

22. A protective bushing as set forth in claim 20, further characterized in that said plunger carries a thermostat which, under certain conditions of operation, acts on said cooperating devices to trip the plunger, and manually operated means for tripping the plunger or restoring it.

23. A protective bushing as set forth in claim 20, further characterized in that said cap is carried on the end of an insulator having a skirt disposed between the cap and connector which are disposed to form an external emergency surge gap.

24. A protective bushing for a transformer having a housing, including a casing composed of insulators joined by a metallic connector for mounting the bushing in the transformer housing, with metallic caps at both ends; one cap acting as a receiver for a current conductor and for parts of a lightning arrester, other lightning arrester parts and an electro-magnetic circuit breaker having a contact connected to said receiver cap and a cooperating contact connected to a movable member controlled at least in part by said electro-magnet all housed within the casing, and a plurality of means within the casing for tripping the circuit breaker, and means for resetting the breaker.

25. A protective bushing for a transformer having a housing, including a casing composed of insulators joined by a metallic connector for mounting the bushing in the transformer housing, with metallic caps at both ends; one acting at least as a receiver for a current conductor, a lightning arrester and a circuit breaker including a part connected to said receiver cap and all housed within the casing, and a plurality of means within the casing for tripping the circuit breaker, and means for resetting the breaker, said tripping means including an armature and an electro-magnet connected in series with the circuit breaker for operating said armature, devices cooperating with said armature for controlling the circuit breaker, and at least a further means comprising a thermostat for operating said devices to trip the circuit breaker.

26. A protective bushing for a primary lead entering an electrical apparatus, including in combination in the same casing, a lightning arrester, and a circuit breaker electrically connected in series with said lead but in shunt to the arrester, and provided with different means for electromagnetically, thermostatically or manually opening the breaker, with means for restoring the breaker to circuit-closed position.

27. A protective bushing for a primary lead entering an electrical apparatus, including in combination in the same casing, a lightning arrester and an electro-magnetic circuit breaker having its coil and contacts connected in series with the lead but in shunt with the arrester, with means for restoring the breaker after it has been opened.

28. A protective bushing for a primary lead entering an electrical apparatus, including in combination in the same casing, a lightning arrester separated in two parts electrically connected in series, a normally fixed air gap and a variable normally high-resistance gap, and an electromagnetic circuit breaker having its circuit parts electrically connected in shunt to the arrester parts but in series with said primary lead and which can be opened by a plurality of means dependent on current flow into the apparatus with which the bushing is used, or on the heat generated from within the apparatus, and means for restoring the breaker after it has been opened.

29. A protective bushing as set forth in claim 28, further characterized in that an auxiliary external arrester gap, in shunt to the interior gaps, is provided to take care of excessive surges coming to the bushing.

30. A protective bushing for the purposes described, including at least a pair of insulators arranged in tandem relation and connected by a metallic connector which also serves as a mounting means for the bushing so one insulator extends within the apparatus to be protected, while the other insulator projects exteriorly thereof, an arrester including parts mounted within the exteriorly positioned insulator, means for connecting a line wire to an arrester part, said metallic connector acting as a ground for said arrester, an auxiliary flash-over gap provided on the outer surface of said exterior insulator in multiple with said arrester, said metallic connector acting as one terminal of the flash-over gap, and means for transmitting working power current through the bushing to the apparatus with which it is used.

31. A protective bushing as set forth in claim 30, further characterized in that a circuit breaker having an electro-magnet is housed within and extends longitudinally of both said bushing insulators, one contact of the circuit breaker being electrically connected to the line side of the arrester and all of the power current going through the bushing being transmitted through the electro-magnet, and means located within said interiorly extending insulator and actuated directly by the electro-magnet for tripping the circuit breaker.

32. A protective bushing for the purposes described, including at least a pair of insulators arranged in tandem relation and connected by a metallic connector which also serves as a mounting means for the bushing so one insulator extends within the apparatus to be protected, while the other insulator projects exteriorly thereof, a line wire connector carried at one end of the insulator assembly, a circuit breaker having an electro-magnet and cooperative parts, including a plunger, all housed within and extending longitudinally of both said bushing insulators, one contact of the circuit breaker being electrically connected to the line wire connector, while the other cooperating contact is moved by the plunger, all of the power current going through the bushing being transmitted through the contacts and electro-magnet, and means located within said interiorly extending insulator and actuated directly by the electro-magnet for tripping the circuit breaker.

JOHN R. GASTON.